United States Patent [19]

Barnebey et al.

[11] 4,010,014

[45] Mar. 1, 1977

[54] FLUID FILTER WITH SUBMERGED PASSAGES

[75] Inventors: Herbert L. Barnebey, Columbus; Bertrand Japikse, Reynoldsburg, both of Ohio

[73] Assignee: Barnebey-Cheney Co., Columbus, Ohio

[22] Filed: June 5, 1975

[21] Appl. No.: 584,120

Related U.S. Application Data

[63] Continuation of Ser. No. 402,969, Oct. 3, 1973, abandoned, which is a continuation of Ser. No. 122,970, March 10, 1971, abandoned.

[52] U.S. Cl. .................................. 55/300; 55/98; 55/387; 55/474; 55/479; 55/512; 55/476
[51] Int. Cl.² ........................................ B01D 41/00
[58] Field of Search ............ 55/474, 300, 387, 479, 55/476, 512, 98, 96, 512

[56] References Cited

UNITED STATES PATENTS

| | | | |
|---|---|---|---|
| 2,150,930 | 3/1939 | Lassiat | 55/479 |
| 2,686,572 | 8/1954 | Cameron | 55/512 |
| 3,090,180 | 5/1963 | Berz et al. | 55/282 |

FOREIGN PATENTS OR APPLICATIONS

| | | | |
|---|---|---|---|
| 450,048 | 7/1936 | United Kingdom | 55/474 |

*Primary Examiner*—Bernard Nozick
*Attorney, Agent, or Firm*—Harness, Dickey & Pierce

[57] ABSTRACT

A fluid filter construction comprises a mass of filtering material, such as activated charcoal, in which fluid flow passage forming members are embedded. The filtering material itself serves as the means for sealing the filter against leakage of unfiltered fluid into or out of the filter and against bypassing from the inlet to the outlet side of the filter.

6 Claims, 6 Drawing Figures

INVENTORS.
Herbert L. Barnebey
Bertrand Japikse
BY
Harness, Dickey & Pierce
ATTORNEYS.

FLUID FILTER WITH SUBMERGED PASSAGES

This is a continuation of application Ser. No. 402,969, filed Oct. 3, 1973, now abandoned, which is, in turn, a continuation of Ser. No. 122,970, filed Mar. 10, 1971, now abandoned.

BRIEF SUMMARY OF THE INVENTION

This invention relates to the filtration of flowing fluids, such as contaminated air.

It is the principal object of the invention to provide a filter construction and a method of filtration wherein sources of leakage such as gaskets, metal joints, non-solid welds or caulking are eliminated and the filter material itself performs the added function of a sealing means and eliminates the harmful effects of leakage.

It is also an object of the invention to provide a filter construction that may be emptied of and recharged with filter material without removal of interior parts, and, if desired, without exposure to atmosphere of contaminated material, and further, if desired, on a continuous basis.

It is another object of the invention to provide a filter construction that is flexible as to size and design so that it may be built to suit very large as well as small installations and to suit a wide range of applications.

It is a further object of the invention to provide a filter apparatus that is efficient in operation yet relatively simple and economical to construct.

These and other objects of the invention are achieved by a reversal of the usual relationship of filter material and flowing fluid in a filter apparatus. In conventional filters the continuum or continuous phase is the fluid being treated and the filter material is supported by suitable means between the filter inlet and outlet to intersect the movement of fluid through the continuum. In such filters, conventional concepts of efficiency dictate that fluid flow be as uniform as possible through all sections of the filter material so that all of it is used for filtering and that special sealing means be employed to prevent bypassing. In filters of the present invention, however, the continuum is the filter material and suitable fluid flow guiding means is embedded in the filter material to create one or more flow paths from the inlet to the outlet of the filter, these paths including a portion or portions of the filter material. In the present filter, the concept of efficient operation is that fluid flow be non-uniform throughout the filter material as a whole. Thus, the material comprises one or more zones of no fluid flow or low fluid flow, which act as self-serving sealing means to prevent leakage of unfiltered fluid, in addition to a filtering zone through which flow is preferably substantially uniform. In one form of the invention this concept is incorporated into a filter by introducing the fluid to be filtered into the filtering zone at a point or points located so that the resistance of the filter material to fluid flow to the nearest outlet is substantially less than its resistance to flow to the nearest area to be sealed. From a slightly different viewpoint, a filter of this form of the invention has a filtering zone located in the filter material so that the pressure drop and/or flow path between any point in the filtering zone and an outlet to the filtering zone is substantially less than it is from such point across any sealing zone.

In applications where seepage of fluid into the filter or leakage of filtered fluid out of the filter is unobjectionable, the filter material is disposed so that any such flow takes place across a layer of filter material of such depth that the desired degree of filtration occurs.

While from the broad standpoint other materials may be used, granular filter material is preferable. The material of choice is a mass of flowable carbonized particles (i.e. activated charcoal) as described in Barnebey U.S. Pat. No. 3,525,674, issued Aug. 25, 1970. Granular filter material flows easily and, therefore, readily assumes any desired shape and presents uniform density and may be readily removed from or added to the filter, if desired. In accordance with a preferred embodiment of the invention, the flow guiding means is submerged or embedded in the mass of granular adsorptive filter particles in such a way that flow goes through the filtering zone but is prevented from bypassing by the sealing zones and the design is characterized by the substantial elimination of gaskets for seals as is customary with conventional constructions.

DESCRIPTION OF THE INVENTION

Figure 1:
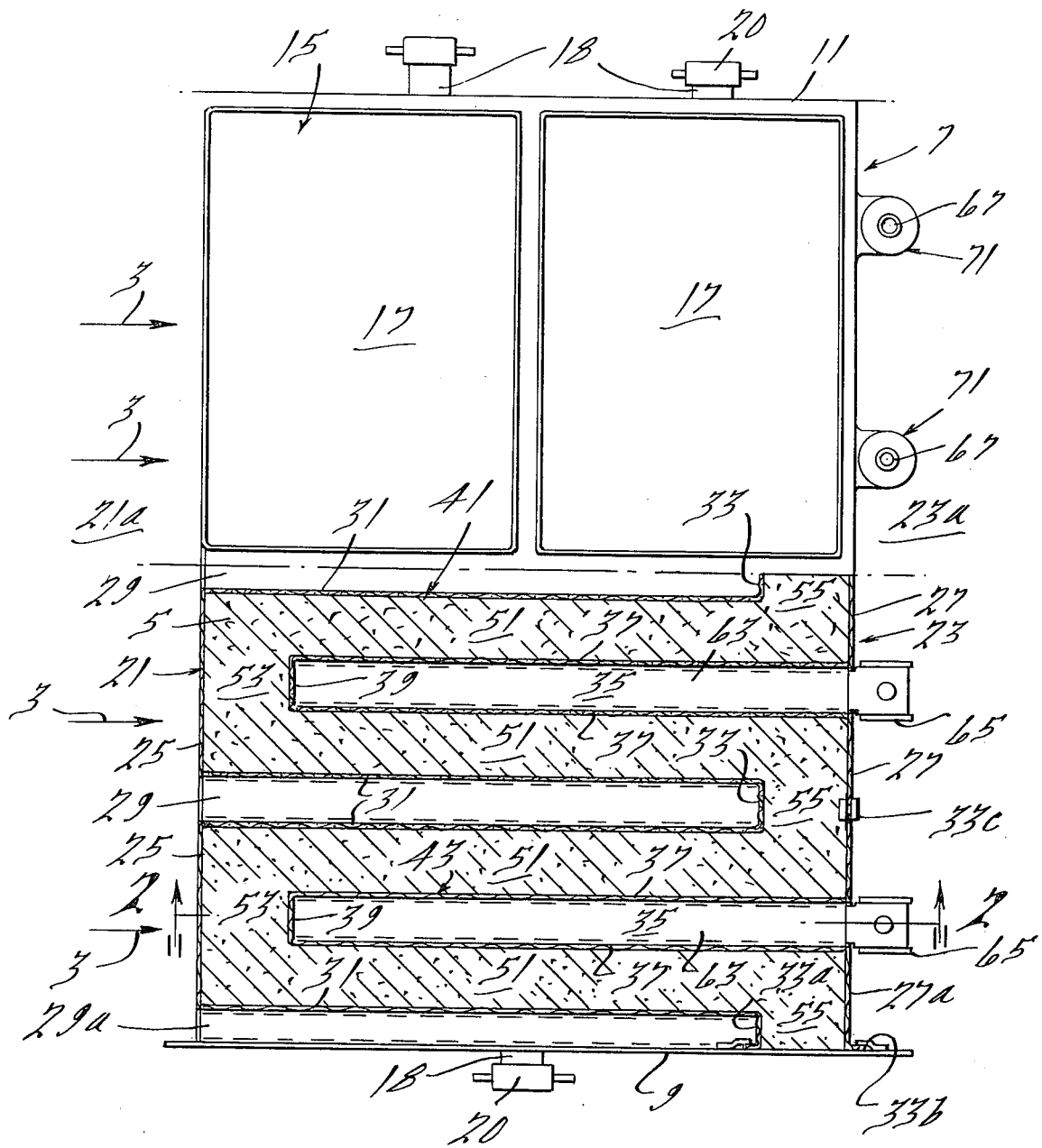
FIG. 1 is a plan view, partly in section and broken away, showing a fluid purification installation including a filter construction embodying the invention.
Figure 2:
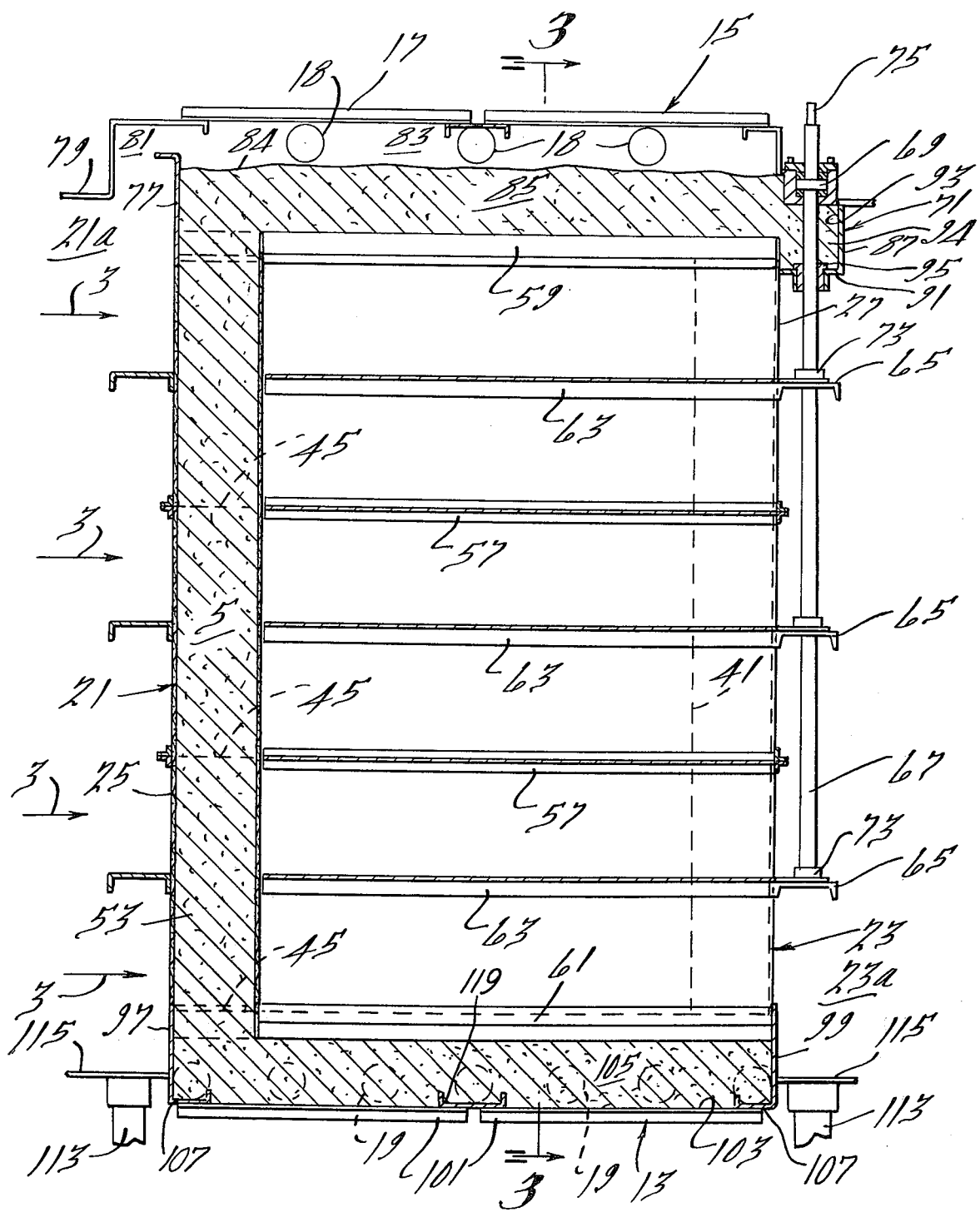
FIG. 2 is a vertical cross section along the line 2—2 of FIG. 1.
Figure 3:
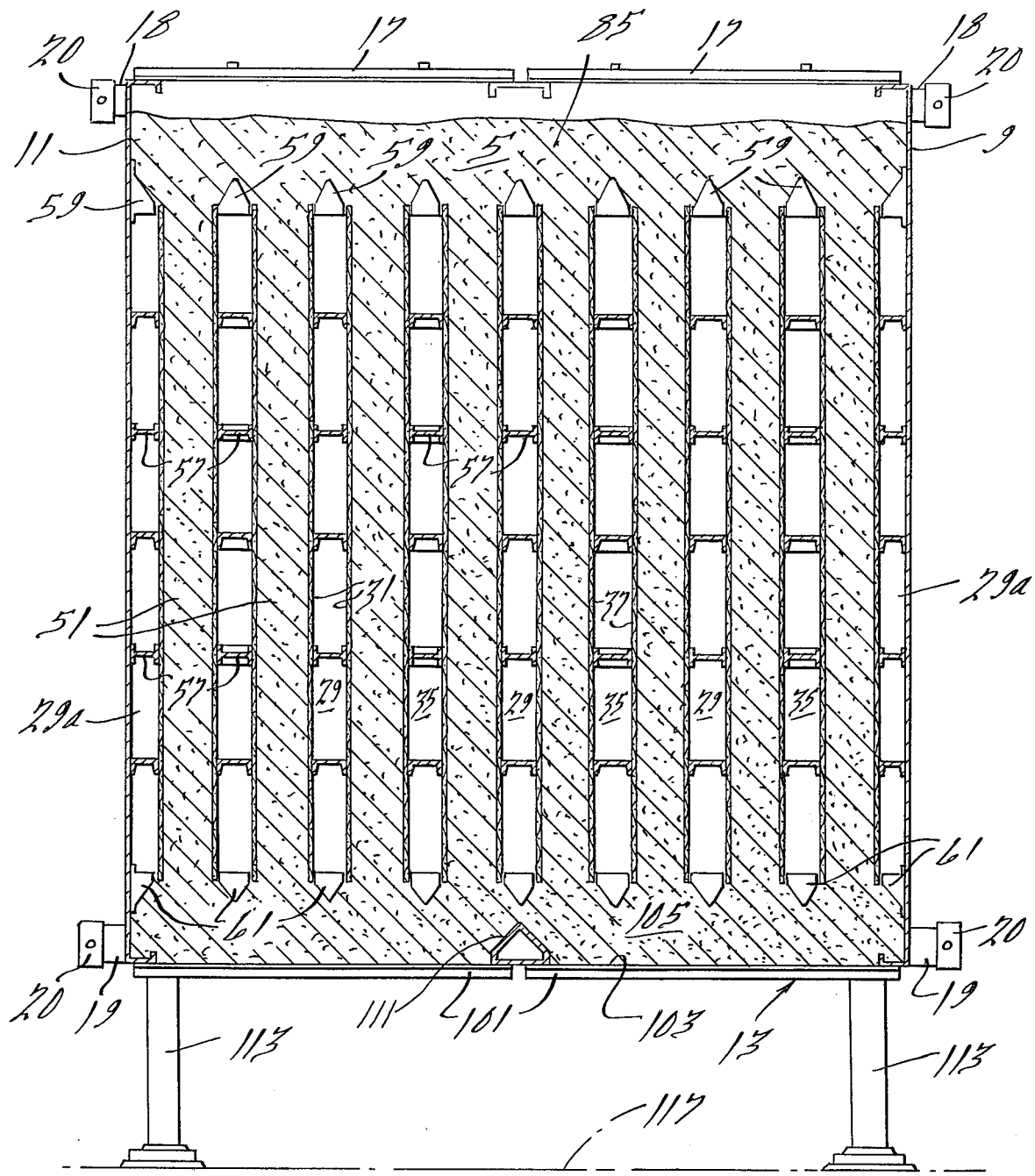
FIG. 3 is a vertical cross section along the line 3—3 of FIG. 2.
Figure 4:
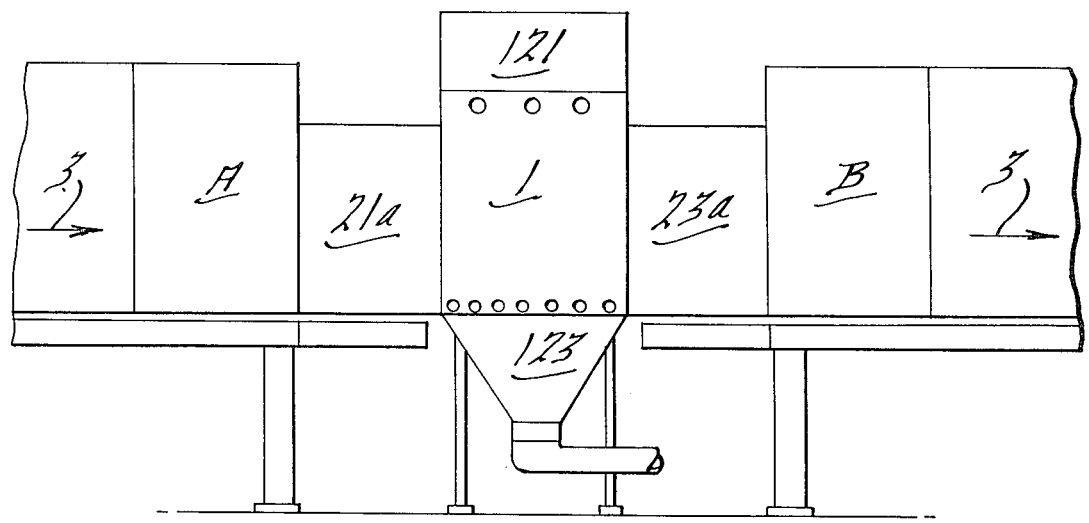
FIG. 4 is a schematic side elevation of a filter train containing a filter embodying the present invention.

FIGS. 1–3 illustrate the invention embodied in a relatively large vertical filter construction 1 wherein, for example, the filter may be about 8 feet high and 4 feet long with staggered vertically extending inlet and outlet passages submerged in a bed of granular filter material, preferably activated charcoal. The design is specially adapted to remove contaminants from an air stream and provides for replacement of the charcoal without removal or alterations of the supporting or flow guiding structure. One specific use for the structure is in a filter train (FIG. 4) as a means to remove radioactive iodine and methyl iodide from an air stream with a high degree of efficiency and with substantially no possibility of harmful leakage. The filter is shown in the train of FIG. 4 in series with an upstream filter means A (which in radioactive applications may be a rough filter and a HEPA filter) and a downstream or after filter means B.

In the filter construction 1 the flow of air to be filtered is from left to right as indicated by the arrows 3 in FIGS. 1 and 2. The granular filter material 5 is loosely contained by a housing or container 7 which has imperforate sheet metal sides 9 and 11 extending lengthwise of the filter and parallel to each other and to the general direction of flow that is indicated by the arrows 3. The housing 7 has a suitable bottom structure indicated at 13 and a top structure 15 that includes removable panels 17, there preferably being four such panels. Tubes 18 are supported adjacent the tops of panels 9 and 11 and open into the interior of the housing 7 to provide port holes for visual inspection of the contents of the housing. A series of longitudinally spaced tubes 19 is supported adjacent the bottom panels 9 and 11 to provide ports through which the granular filter material 5 may be removed from the interior of the housing 7 as will be referred to hereinafter. Each of the port tubes 18 and 19 is closed by a threaded-on cap 20 which may include suitable gasket means (not shown) so that the tubes are fluid-tight when the caps are tightened, though, as will become apparent, problems of fluid leakage are overcome by the sealing means provided by material 5.

The filter construction has an inlet side 21 with an adjacent inlet chamber 21a and an outlet side 23 with an adjacent outlet chamber 23a. The inlet side 21 is defined by vertically extending, coplanar wall members 25 while the outlet side 23 is defined by coplanar wall members 27. The members 25 and 27 may be imperforate sheet metal blanks but, as illustrated, are preferably screens formed integrally with inlet and outlet passage forming or flow guiding sections. Thus, inlet passages 29 are each formed by side screen sections 31 which extend parallel to walls 9 and 11 and by an internal end screen section 33 which is parallel to wall member 25. The outlet passages 35 are each formed by side screen sections 37, which are integral with wall members 27 and extend parallel to walls 9 and 11, and by an integral end screen section 39. The inlet wall and passage members may be formed by shaping a screen 41 in a zig-zag or pleated fashion and the outlet wall and passage members may be formed by shaping a screen 43 in a zig-zag fashion and then interfitting the two screens. In the embodiment illustrated, the total vertical height of the screens 41 and 43 is formed by building them in three sections as indicated in FIG. 2 at 45.

The inlet and outlet passages 29 and 35 are staggered and parallel to each other and separated by vertical beds or layers 51 of filter material through which fluid must pass to flow from the inlet to the outlet side of the filter. The layers therefore provide a filter means and form a filter zone in the material 5. The end sections 39 and the inlet walls 25 are separated by vertical layers 53 of filter material and these layers are at least as thick as and, as illustrated, preferably thicker than layers 51. Similarly, thicker layers 55 separate the walls 33 and 27. The additional thicknesses of layer 55 adjacent the end inlet passage 29a (FIG. 1) is particularly desirable to counteract any wall effect, i.e., reduced flow resistance, between end screen 33a and adjacent screen member 27a. The layers 53 and 55, like layers 51, act as a filter means and provide a portion of the filter zone in material 5. If the sections 25 and 27 were imperforate, as may be desirable in some applications, the layers 53 and 55 will act as sealing means and provide a sealing zone in the material 5.

As seen best in FIG. 3, the side screen sections 31 and 37 may be strengthened by intermediate cross braces 57 and by top and bottom wedge shaped closure members 59 and 61, respectively, which extend the lengths of the passages 29 and 35. The wedge shape of members 59 and 61 facilitate flow of the granular material 5. Additional cross braces 63 in the outlet passages are also illustrated and these have rearwardly projecting flanges 65 that extend beyond the outlet side 23. The flanges 65 have aligned openings that receive rotary shafts 67, the upper ends of which are supported in suitable thrust bearing structures 69 that are carried in upper rear wall sections 71 of the housing 7. The shafts 67 have suitable connections 73 with the flanges 65, such as cam arrangements, so that rotation of the shafts causes vibration or shaking of the braces 63. This movement is transmitted to the screen 43 and to the filter material 5 and the resulting vibration insures that the granules or particles are fluid and alive and settle to a substantially uniform density with no voids, channels, pockets, or bridges. The screens 43 are loosely held by retaining strips 33b and 33c to permit screens to vibrate, but without loss of charcoal through the clearances, which are small enough to prevent charcoal particles from sifting through. The non-circular top ends 75 of the shaft 67 provide a means of connection to a suitable power rotating means, such as a pneumatic torquer. It is apparent that various other types of agitation means may be used, such as rotary stir rods extending vertically through sections of the filter material.

As seen best in FIGS. 1 and 2, the upper rear wall sections 71 of housing 7 are a part of the top structure 15 that includes the upper portions of sidewalls 9 and 11 (FIG. 3), a blank wall section 77 which is coplanar with inlet wall sections 25, and an angled wall section 79 which is spaced from section 77 and defines with it a pressure equalizing passage 81 connecting the inlet chamber 21a to a pressure pad or equalizing chamber 83 between the top panels 17 and the top surface 84 of the filter material 5. Incoming fluid to be treated can, therefore, flow to the chamber 83 as well as to inlet passages 29 so that inlet pressure acts on the top of the filter material 5 and, along with the force of gravity, holds it in a condition of maximum density. Where pressure conditions make it desirable, the top chamber 83 could, by a reversal of the structure, be exposed to pressure in the outlet chamber 23a or to any other desired pressure.

The filter material 5 has a horizontal layer 85 below the top surface 84 which is continuous and covers the entire cross section of the housing 7. It acts as a particle hopper section and as a sealing means and sealing zone. It prevents unfiltered bypassing of fluid from the inlet passages 29 to the outlet passages 35 through openings in the joints between the braces 59 and the side screens 31 and 37. Fluid tight joints are, therefore, not required; it is only necessary that the joints be sufficiently tight to prevent the particles of filter material from passing through them into passages 29 and 35.

The layer 85 is at least as thick as the bed sections 51 and, in the embodiment illustrated, is shown with an effective depth that is slightly greater than the thickness of beds 51. Its resistance to fluid flow is, therefore, not substantially greater than that of beds 51 and some fluid will pass through it and be filtered as it flows to outlet passages 35. The layer 85, therefore, serves as both a sealing means and a filtering means as well as hopper means and pressure pad means for the mass of material 5.

As seen in FIGS. 1 and 2 each rear wall section 71 has a back wall portion 87 and a bottom wall portion 91 that define a chamber 93 which is an extension of the top layer 85. The shafts 67 pass through chambers 93 and through packed bearings 95 in the bottom wall portions 91. The chambers 93 are filled with beds 94 of filter material to act as a sealing means and sealing zone and are offset downwardly to provide a flow path to the joints provided by bearings 95, and any other potential points of leakage in sections 71, that substantially exceeds in length the filter paths that fluid may follow. Thus, seepage or leakage is effectively precluded, either into or out of the housing 7, and any that may occur under extraordinary circumstances is filtered.

As seen in FIGS. 2 and 3, the bottom structure 13 of the filter comprises blank or imperforate front and rear wall portions 97 and 99 which together with the lower portions of sidewalls 9 and 11 and bottom panels 101 define a bottom chamber 103. The chamber 103 is filled with filter material that forms a sealing layer and zone 105 that is at least as thick as beds 51 and, preferably, is thicker as illustrated. The layer 105 acts as a sealing means to preclude unfiltered leakage between the passages 29 and 35 through non-fluid tight joints of the side screens and braces 61 as well as unfiltered leakage from the inlet chamber 21a out of the bottom panels 101. The latter may be bolted on to flanges 107 of the bottom section wall structure and to central cross pieces 109 and 111. The bolted joints should be filter material tight but need not be fluid tight (unless the filtered fluid is obnoxious to the surrounding environment) since leakage out of the housing 7 through the joints will be filtered by passage of the fluid through sealing means layer 105.

Legs 113 may be attached to brackets 115 on the bottom structure 13 to raise the bottom panels 101 above the floor 117 so that they can be removed for inspection or cleaning of the inside of the housing 7.

Since all the sealing and filtering zones are formed by a common mass 5 of filter particles, removal of the filter material from the housing 7 may be achieved by uncapping ports 19 to permit gravity drainage. Preferably, however, a vacuum unit (not shown) is attached to the ports to evacuate all the material into drums or bags for disposal without creating dust or any contact with the atmosphere. The housing can then be recharged from the top. No internal parts need to be removed and it is not necessary to touch or be exposed to used filter material. The construction may also be adapted to continuous flow of filter material or automatic cyclic flow by attaching a feed unit to the upper ports 18, or using a hopper 121 (FIG. 4) in place of panels 17, and by attaching a drainage unit 123 (FIG. 4) to the lower ports 19 which may be designed (as shown) to prevent contact of the used material with the surrounding area. If desired bags sealed to the bottom of hopper 123 could be used to remove used material. In the case of continuous or automatic cyclic flow the wedge shape of various internal parts or braces along with operation of the agitating means would insure uniform density of filter material.

It is understood that the size and shape of the fluid passage means and the size of the filter beds are selected to achieve optimum efficiency of operation, one phase of which would be relatively uniform flow through beds 51. End inlet passages 29a, for example, are somewhat smaller than internal inlet passages 29 for this purpose. Preferably, the thicknesses of the filtering zones and the sealing zones are such that the resistance to fluid flow from the inlet passages 29 to the outlet passages 35 through the filter zone 51 is less than its resistance to flow through the sealing zones, i.e., the pressure drop across the sealing zones exceeds that across the filter zone. The filter material, which is preferably activated charcoal, is of controlled particle size and, if not uniform in size, the particles are at least a mixture restricted to a relatively narrow range of sizes. Particle size control plus the use of the agitation means insures against settling or channeling and provides proper nesting and a relatively uniform density throughout the medium 5. The flowing fluid also helps to achieve uniformity. The weight of the material as well as the restraining effect of the container 7 and fluid passage means provide an anti-balloon effect to keep the material 5 from substantially expanding.

The operation of the filter 1 is self-evident with contaminated air in inlet chamber 21a following the fluid inlet passage means 29 through the filter zone or means 51 to the outlet fluid passage means 35 and thence to outlet chamber 23a. Continuous sealing zones 85 and 105 of filter material 5 act as sealing means for the top and bottom of the fluid passages and these layers along with the vertical layers 53 and 55 act to embed or submerge the passages 29 and 35 in the filter material on all sides except their inlet or outlet edges, respectively. Potential leakage at bushings 95 is precluded by sealing zones 94 of filter material. Because the fluid passages are thoroughly submerged in filter material it is not necessary that interfitting parts meet in fluid tight joints; it is sufficient if they meet with an exactness that prevents flow of charcoal (or other filter granules) through the joints. The construction is not designed to preclude all fluid leakage but rather to insure that all leaks (in or out) are through the filter material and through at least the same thickness of filter material or at least as low a velocity as is the case with filter zone 51. If required, baffles or other devices may be used to prevent troublesome short circuiting. The wedge braces 59 and 61 are to some degree as baffles to interfere with leakage from an end of an inlet passage to an end of an outlet passage.

Figure 5:
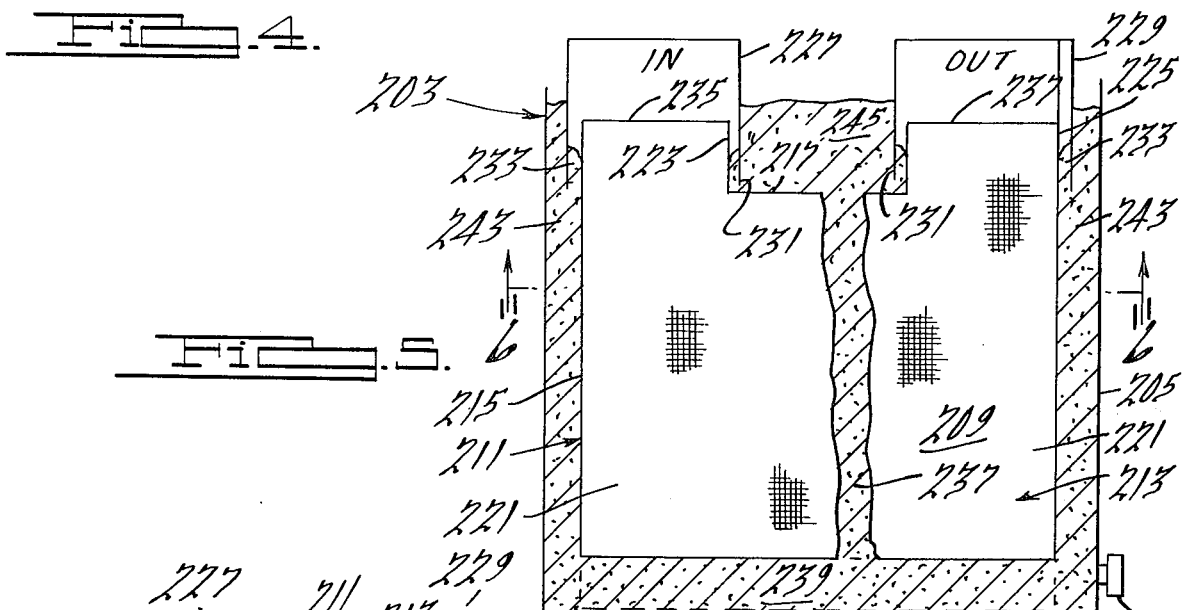
FIG. 5 is a schematic vertical section on two planes (line 5—5 of FIG. 6) of a modified form of filter embodying the invention.
Figure 6:
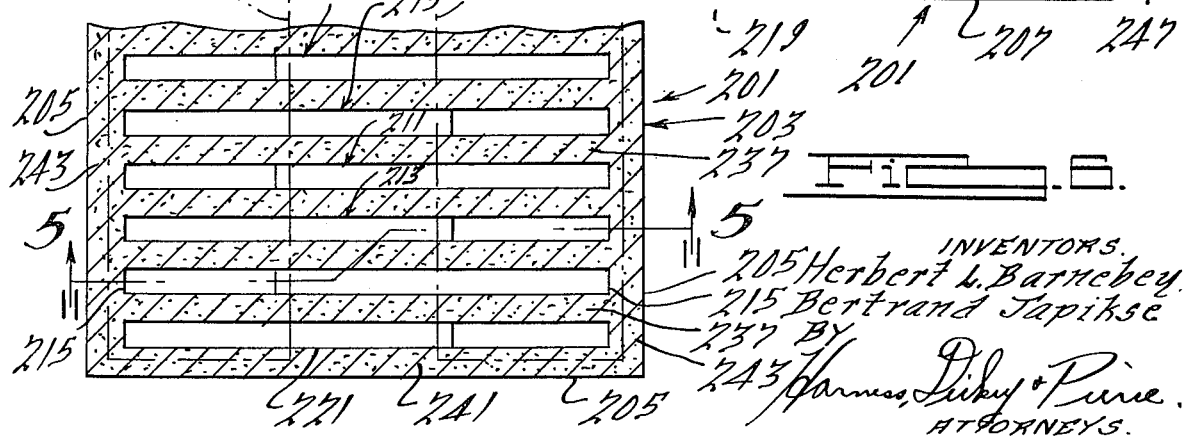
FIG. 6 is a section along line 6—6 of FIG. 5.

FIGS. 5 and 6 show a modified form of filter 201 embodying the invention wherein an open top, box-like container 203 having sidewalls 205 and a bottom wall 207 is used to hold the granular filter material 209, preferably activated charcoal. The container does not have to be fluid tight merely tight enough to prevent loss of filter material. Fluid passage means in the form of hollow perforated inlet and outlet panels 211 and 213, respectively, are submerged in the material 209. The panels are preferably closed by walls 215 on the ends and by walls 217 on the tops, and open on the bottom 219 so that the bottom edge of each is submerged in filter material. The walls 215 and 217 along with the sidewalls 221 may be perforated plate or screens.

Each panel has an integral vertical section extending upwardly from the top wall 217, these comprising an inlet 223 for the inlet passage forming panels and the outlet 225 for the outlet passage forming panels. The inlets 223 are aligned on one side of the container 203 and the outlets 225 are aligned on the opposite side. Inlet and outlet manifold boxes 227 and 299, respectively, are positioned over all the respective inlets and outlets. The manifolds have closed sidewalls and tops, with suitable fluid flow ports (not shown), but are open on their bottom faces so that their bottom edges 231 are submerged to a substantial depth in filter material 209. No attempt is made to fit the manifolds closely to the sides of the inlets and outlets as seen by the gaps at joints 233.

The granular filter material surrounds the panels 211 and 213 on all sides except the top inlet and outlet edges 235 and 237. The vertical layers 237 of filter material between the panels comprise the filter means and filter zone which is totally contained within an outer layer that forms a sealing means and sealing zone. The sealing zone comprises a continuous bottom layer 239 resting on and all across the bottom wall 207 of the container 203, vertical side layers 241 extending parallel to the flow panels, and vertical side layers 243 extending at right angles to the flow panels, and a top layer 245 that is in part the top sections of various vertical layers but also includes the filter material supported on and covering the top walls 217. The bottom edges 231 of the manifolds are buried in the top layer 245 and filter material from this layer closes and seals the joints 233.

Filter particle drainage means in the form of a capped port 247 at the bottom of container 203 is illustrated and it may be used in the manner described in connection with FIGS. 1–3. Agitation means (not shown) of a suitable type may be mounted in the container 203 or the container as a whole may be mounted on a vibratory support. The top layer 245 acts as a hopper or reservoir as well as a pressure pad to furnish particles to fill voids and to insure uniformly dense nesting of the particles.

In operation, fluid from the inlet manifold enters inlet passage panels 211 through inlet portions 223. Since the layers 237 forming the filter zone are of the least thickness, they present the normal paths of flow, i.e. along paths of minimum pressure drop or least resistance to flow, and fluid from an inlet panel 211 crosses the adjacent layers 237 where it is filtered, to enter outlet passage panels 213 and flow through outlet portions 225 to the outlet manifold 229. The filter zone or filter means 237 is completely surrounded by a sealing zone formed by the sealing means provided by layers 239, 241, 243, and 245 so that there can be no unfiltered leakage either into or out of the container 203 or the fluid passages 211 and 213.

The filter 201 (and equivalents) is of simple economical construction and may, like filter 1, be made in a wide range of sizes and readily adjusted to a wide range of filter conditions. The use of filter material as a sealing means substantially eliminates the need for gaskets or fluid tight joints between parts.

As indicated, activated charcoal is the preferred filter material. The particle size would be generally larger than 20 mesh; for example, it might be 4 × 6 mesh, 6 × 10 mesh, 8 × 12 mesh, or 8 × 14 mesh. Also, as indicated, if mixtures of particle sizes are used, the range of sizes should be relatively narrow. Activated charcoal particles flow well and nest well, provide a uniform density throughout the filter mass, are highly adsorptive and will also filter by mechanical straining. Angle of repose problems are avoided by the present constructions; for example, the wedge braces 59 and the wedge topped bottom member 102 (FIG. 3) eliminate dead sections and enable the charcoal to flow without pocket formations. Potential points or joints of leakage are submerged in the filter material to a depth such that leakage is inhibited by the resistance to flow and, if it still occurs, it is filtered. The use of the filter material as a sealing means also provides a pressure relief device so that in the event of an unanticipated excessive pressure condition in the fluid, the filter material will blow out and structural damage avoided.

The filters of the invention incorporate a method of filtration wherein fluid to be filtered is introduced into a mass of filter material at a central point so as to form a filter zone in the mass that communicates with an outlet to the filter. The filter zone is located in the mass so that a sealing zone of filter material substantially surrounds the filter zone on all sides through which leakage might occur and presents a resistance or pressure drop to leakage that is at least equal to and preferably exceeds that of the filter zone. If desired, the filter material may be continuously added and removed from the mass preferably with the continuous operation of an agitating means to insure uniform density.

Two specific structural embodiments of the invention have been described but it will be understood that various other sturctures may be utilized to embody the invention. While filtration has been referred to throughout, it will be understood that use for desorption is the equivalent and that, in fact, both adsorption and desorption may be carried out in the same structure.

We claim:

1. A filter construction characterized by the substantial elimination of gaskets to prevent bypass leakage of unfiltered fluid comprising a container having an inlet chamber for incoming fluid and having an outlet side spaced from the inlet chamber, said container having a horizontally disposed bottom wall and a vertically disposed side wall, a substantially uniform density mass of granular filter material substantially filling said container and supported on said bottom wall and confined by said side wall, flow guiding wall means embedded in said mass and supported in the container including an inlet area and an outlet area and acting to direct fluid flow through said mass from said inlet chamber to said outlet side and defining a filter zone in said mass consisting of all normal paths of fluid flow through said mass from said inlet area to said outlet area, said filter zone being located centrally within the mass of filter material and being bounded by a thick layer of filter material, said thick layer providing a sealing zone of filter material and all portions of said layer being at least as thick as any portion of the filter zone traversed by fluid flowing from the inlet area to the outlet area, said sealing zone serving to prevent bypassing of unfiltered fluid from the inlet area out of the mass and from the inlet chamber to the outlet side, said flow guiding means comprising horizontally spaced vertically extending parallel perforated wall members providing said inlet area and outlet area and staggered inlet and outlet fluid passages communicating respectively with said inlet chamber and outlet side, and braces between said wall members.

2. A filter construction as set forth in claim 1 including baffle means in said mass.

3. A filter construction as set forth in claim 2 wherein said baffle means comprises braces at the ends of the wall members.

4. A filter construction as set forth in claim 3 including agitating means supported on the container.

5. A filter construction as set forth in claim 4 wherein said agitating means is connected to certain of said braces to cause vibration of certain of said wall members.

6. A filter construction characterized by the substantial elimination of gaskets to prevent bypass leakage of unfiltered fluid comprising a container having an inlet chamber for incoming fluid and having an outlet side spaced from the inlet chamber, said container having a horizontally disposed bottom wall and a vertically disposed side wall, a substantially uniform density mass of granular filter material substantially filling said container and supported on said bottom wall and confined by said side wall, flow guiding wall means embedded in said mass and supported in the container including an inlet area and an outlet area and acting to direct fluid flow through said mass from said inlet chamber to said outlet side and defining a filter zone in said mass consisting of all normal paths of fluid flow through said mass from said inlet area to said outlet area, said filter zone being located centrally within the mass of filter material and being bounded by a thick layer of filter material, said thick layer providing a sealing zone of filter material and all portions of said layer being at least as thick as any portion of the filter zone traversed by fluid flowing from the inlet area to the outlet area, said sealing zone serving to prevent bypassing of unfiltered fluid from the inlet area out of the mass and from the inlet chamber to the outlet side, and wedge shaped members embedded in the filter mass to provide for flow of all the granular filter material and eliminate formation of pockets wherein there is no flow of filter material.

* * * * *